United States Patent Office 3,701,823
Patented Oct. 31, 1972

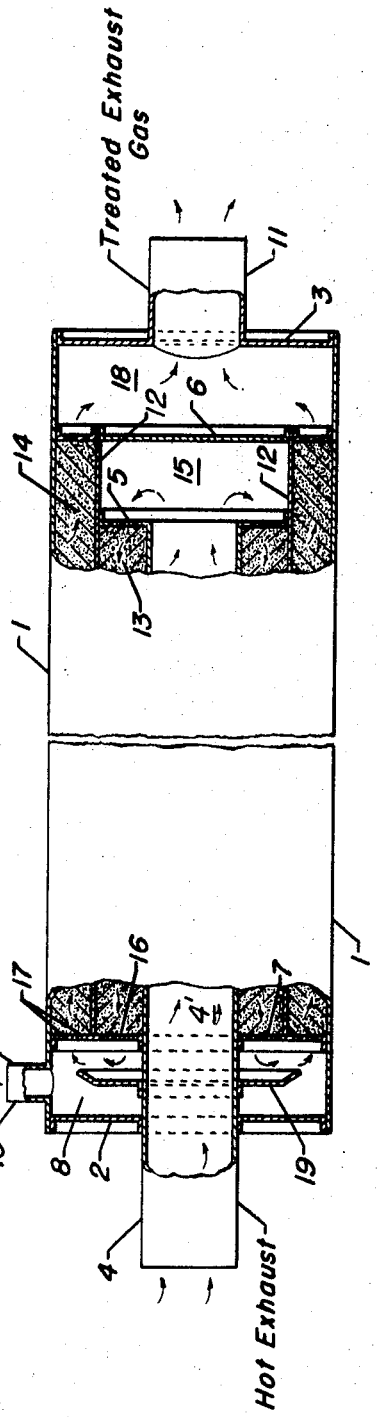
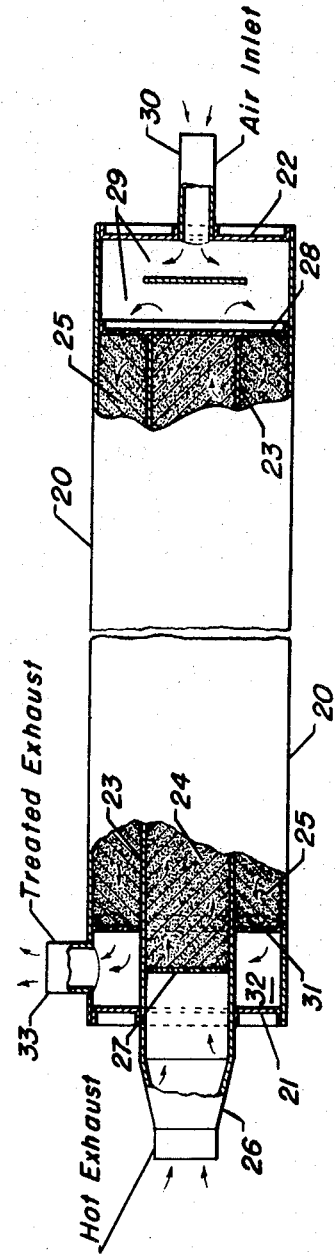

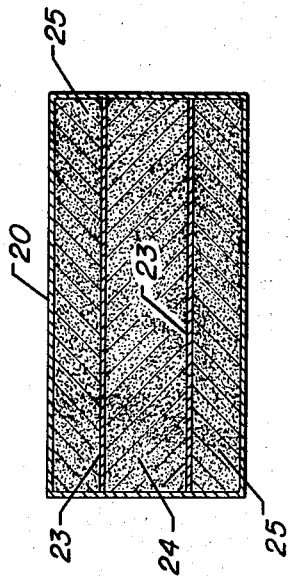
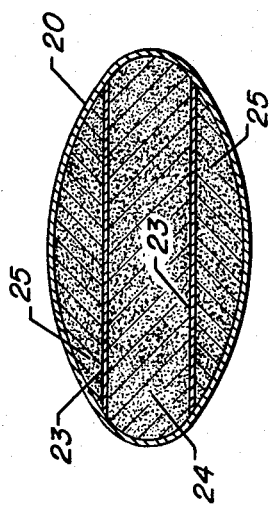
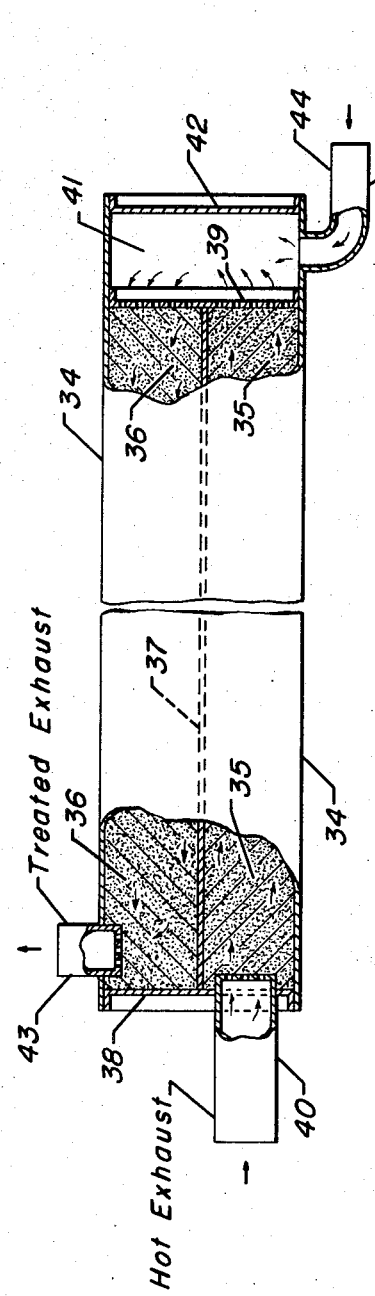

3,701,823
METHOD AND MEANS FOR TWO-STAGE CATALYTIC TREATING OF ENGINE EXHAUST GASES
Leslie C. Hardison, Barrington, Ill., assignor to Universal Oil Products Company, Des Plaines, Ill.
Continuation-in-part of application Ser. No. 762,554, Sept. 25, 1968. This application Sept. 2, 1970, Ser. No. 69,060
The portion of the term of the patent subsequent to Dec. 1, 1987, has been disclaimed
Int. Cl. B01d 53/00; B01j 9/04
U.S. Cl. 423—213
8 Claims

ABSTRACT OF THE DISCLOSURE

A two-stage catalytic treatment of engine exhaust gases by passing the hot gas stream without cooling and without added air through a first catalyst section to effect reduction of nitrogen oxides and then mixing air with the resulting stream for passage through a second stage catalyst section so as to effect more complete oxidation of CO and unburned hydrocarbons. A preferred apparatus is built to have the second catalyst stage along side of and in heat-exchange relationship with the first stage so as to assist in maintaining a high temperature first catalytic reduction section.

---

This application is a continuation-in-part of my copending application Ser. No. 762,554 filed Sept. 25, 1968, now issued as U.S. Pat. No. 3,544,264.

The present invention relates to an improved two-stage method and means for catalytically treating an engine exhaust gas stream. More specifically, the improved system provides for the catalytic reduction of nitrogen oxides in a first stage catalyst section and then air addition prior to the second stage catalyst contact so that there may be a more complete oxidation of CO and residual hydrocarbons.

The need to remove or convert the noxious components in vehicular exhaust gases is now well established as a means for overcoming general air pollution and the smog problem in specific geographical areas. Further, it appears that it will be necessary to have either a catalytic or thermal after burner means to provide adequate removal of the noxious components from an engine exhaust. It is, of course, realized that there are many types of converters which have been tried and which may be made available for engine exhaust gas treatment. However, a major problem has existed in connection with the removal of nitrogen oxides which are produced in internal combustion engines and which generally pass on through the converter without conversion or removal.

It is thus an object of the present invention to provide an improved two-stage catalytic conversion system which will reduce nitrogen oxides ($NO_x$) content, as well as the carbon monoxide (CO) and hydrocarbons from the stream to be discharged.

It may also be considered an object of the invention to provide a novel two-stage flow scheme and apparatus arrangement such that the first stage $NO_x$ reduction contact is carried out with a minimum of heat loss from the converter, by having the second stage catalytic oxidizing zone be in heat exchange relationship with the first stage zone. In addition, or alternatively, the second stage zone may at least be partially in heat exchange relationship with the inlet passageway.

Auto engines are adjusted to operate at near the stoichiometric air to fuel ratios, but because of non-uniform conditions, including varying speeds, automatic choking, improper timing, etc., there is a relatively high production of nitrogen oxides in the engine itself. These nitrogen oxides can be reduced and removed by an overall type reaction of the nature of:

$$2CO + 2NO \rightarrow N_2 + 2CO_2 + Heat$$

Preferably, for the present system, the exhaust gas stream would be that obtained from a slightly rich mixture so that sufficient CO will be present to permit the catalytic reduction of the $NO_x$ content. Residual oxygen will, however, react with CO in preference to $NO_x$ in the presence of a suitable reduction catalyst.

Broadly, the present invention provides for an improved method of catalytically converting an engine exhaust gas stream to reduce the emission of nitrogen oxides, in a manner which comprises, passing the exhaust gas stream without cooling and without admission of air into contact with a first stage of reduction catalyst to effect catalytic reduction of nitrogen oxides, subsequently mixing air with the resulting product stream and passing the mixture into contact with a second stage catalyst bed maintained in a heat exchange relationship with the first catalyst stage to transfer heat thereto and to effect oxidation and elimination of carbon monoxide and unburned hydrocarbons from the exhaust gas stream.

In another aspect, the present invention embodies a two-stage catalytic converter muffler for treating an engine exhaust gas stream, which comprises in combination, an elongated housing with a non-perforate partitioning means positioned in the housing to form an inner first stage catalyst retaining section and a separate second stage catalyst retaining section which is in a side-by-side relationship with said first stage, additional partitioning at the downstream end of said inner catalyst section forming an air inlet plenum section between said catalyst retaining sections, a gas inlet to said first catalyst retaining section, an air inlet to said plenum section, and a treated gas outlet means from said housing and from the downstream end of said second stage catalyst retaining section.

The reduction catalyst which is utilized in the first stage catalyst section may be any suitable high temperature resistant catalyst adapted for reducing nitrogen oxides into nitrogen and $CO_2$ in accordance with the formula set forth hereinbefore. For example, the catalyst may comprise a copper oxide impregnated on a suitable temperature resistant support material such as aluminum oxide. Also, metal oxide materials of the iron group of metals may be used to advantage as a suitable reducing catalyst in the first stage of contact. A catalytically active component may be used singly, or in combination with one or more other catalyst components, and the active components may be composited with an inorganic refractory oxide, such as alumina, or silica-alumina, silica-alumina-zirconia, silica-thoria, silica-boria, and the like. As to form or shape, the catalyst may be supplied in the form of spheres, cylinders, or pellets which may be retained in a confined bed. Also, the catalyst may be in the form of impregnated fibers which in turn may be placed in a mat-like bed arrangement. Where spheres or pellets are used, then they shall have sufficient dimension, say of the order of 1/16" to about 1/4", to be readily retained within a perforate catalyst retaining section.

In connection with the oxidizing catalyst used in the second stage zone of the system, it is again not intended to limit the present invention to any one type of catalyst, inasmuch as suitable oxidation catalytic materials may include the metals of Groups I, V, VI and VIII of the Periodic Table particularly copper, silver, vanadium, chromium, iron, cobalt, nickel and platinum or palladium with the components being used singly or in combination with one or more other active components. The active component(s) may be composited with, or supported by, a suitable refractory inorganic oxide, such as alumina or other known inorganic oxides, as set forth hereinbefore in connection with the reducing catalyst support material. Similarly, the catalyst may be of a spherical or pellet-like nature or, alternatively, of fibrous nature and supplied in a mat-like arrangement having physical shape or dimension suitable for placement within a perforate catalyst containing section.

Inasmuch as it is desired to have the improved flow system position the reducing catalyst section where there is a retention of heat, then such section shall be within the interior of the housing in a manner to receive heat from the oxidizing catalyst section. Thus, the over-all system will normally involve a reverse flow arrangement between catalyst sections, with the treated exhaust gas leaving a first stage gas section at a downstream end thereof in a manner to reverse direction of flow and then pass through a second stage oxidizing catalyst section in a manner to have heat exchange relationship therewith. The air addition to the system, in order to enhance catalytic oxidation in the second stage of contact, may be made at the downstream end of the first stage catalyst contact in a suitable mixing chamber or plenum zone, whereby the air can be uniformly mixed with the exhaust gases prior to entering the second stage zone.

In an apparatus arrangement, a first stage catalyst reducing section may be made in an elongated form and the second stage oxidizing catalyst section similarly will be made in an elongated form so as to be coextensive with the first stage catalyst section. In addition, a suitable mixing section or plenum zone will be provided at the downstream end of the first stage catalyst section in order to introduce and admix air into the gas stream prior to its travel through the outer annular oxidation section.

In another arrangement, which may be preferred for some operations, there can be an exhaust gas inlet flow carrying axially into the interior of the housing and therethrough to the end of a catalyst zone where there is a reverse flow back through a first stage reducing catalyst section which may be in one layer or in two layers that straddle the inlet passageway. The stream then takes a reverse flow pattern through a partially encompassing second catalyst retaining section where there is an oxidizing reaction for the exhaust gas stream prior to discharge from the housing. In this case, the added air will be introduced at the downstream end of the first stage contact and just ahead of the inlet end to the outer catalyst section whereby sufficient air will be present to insure efficient catalytic oxidation of remaining CO and unburned hydrocarbons in the exhaust gas stream.

Reference to the accompanying drawing and the following description thereof will serve to better illustrate the invention and set forth additional advantages in connection therewith.

DESCRIPTION OF THE DRAWING

FIG. 1 of the drawing shows, in a diagrammatic sectional-elevational view, one embodiment of the two-stage converter-muffler, which maintains an inner two-layer catalyst reducing section sandwiched between a two-layer outer oxidation section.

FIG. 2 of the drawing shows an alternative and somewhat simplified apparatus arrangement also in a diagrammatic sectional-elevational view, with the first stage catalyst section being in a single layer sandwiched between a split layer second stage section so as to provide two surfaces in heat exchange relationship with the first section.

FIGS. 3 and 3a of the drawing show in cross-sectional views alternative configurations for the housing and the internal catalyst beds that are indicated in FIG. 2 of the drawing.

FIG. 4 of the drawing is a longitudinal sectional-elevational view indicating a simplified two-zone arrangement where there is but one heat exchange surface between the two zones.

Referring now particularly to FIG. 1 of the drawing, there is indicated an outer housing 1 having an inlet end tube sheet 2 and an opposing end tube sheet 3. At the inlet end of the unit, a conduit 4 extends through the end tube sheet 2 and carries axially through a major portion of the housing to terminate at a perforate partitioning member 5 and at a spaced distance from an inner nonperforate partitioning member 6. There is also indicated an inner perforate partitioning plate 7 which surrounds the conduit 4 and is spaced inwardly from the end tube sheet 2 in order to form an air inlet plenum section 8 which has an inlet 10 passing through housing 1 into the interior thereof. The plenum section 8 actually serves a dual function in that it provides for the addition of air into the interior of the converter while, at the same time, effecting a redistribution of air and gas into the second stage catalyst section. Intermediate non-perforate partition members 12, extend between plates 6 and 7, are used to define inner catalyst retaining sections 13 and outer catalyst retaining sections 14. An outlet 11 in connection with end plate 3 provides for the discharge of the treated exhaust gas stream from the unit.

In accordance with the present invention, the inner catalyst retaining sections 13 are used to hold a suitable high temperature resistant, reducing type catalyst, such as copper oxide on alumina and the outer annular catalyst sections 14 will hold a suitable high temperature resistant oxidizing catalyst such as chromium oxide, vanadium oxide, platinum, palladium, or the like, on a suitable support material. Thus, the engine exhaust gas flow into the improved converter-muffler will be axially through the inner passageway 4' to a gas distribution section 15 where there will be a reverse flow through perforate partitioning means 5 into reducing section 13 to be then discharged into the plenum section 8, by way of perforate means 16 in partitioning plate 7, for an intermixing with air which is introduced by way of inlet port 10. Thus, a resulting reduced gas stream, with added air, reverses flow to pass through openings 17 in partioning member 7 so as to pass longitudinally through the outer catalyst sections 14 to be discharged into a collection zone 18 prior to final discharge through exhaust port 11.

It will be seen that the inner catalyst sections 13 are in a position to be in heat exchange relationship with the hot exhaust gas stream entering through conduit 4 as well as be in direct contact with partition 12 and in heat exchange relationship with the outer high temperature oxidation sections 14. In zone 15, there is a certain amount of heat exchange, through plates 12, between the gas inlet stream and the end of the oxidizing zones 14. Where it is desired, this relationship can be increased whereby there is a maximum amount of heat available for the nitrogen oxides reducing reaction taking place in sections 13. Also, preferably, the entire unit may be rather closely coupled with the exhaust gas manifold of the particular internal combustion engine so that the nitrogen oxides which are formed in the engine will carry to the converter unit at a high temperature and in a form which may be more readily reduced than if they are permitted to carry along under decreasing temperature conditions whereby they will become more difficultly reducible. It is also to be noted that no air is to be added ahead of the converter by way of aspiration or by way of blower means so that the reducing reaction will take place in the presence of reducing catalyst maintained within sections 13 under the most favorable conditions.

After maximum reduction, air is admitted into zone 8 and the mixture carried into the upstream end of catalyst oxidizing sections 14, as heretofore described. In the present embodiment, it will be noted that an additional baffle means 19 has been placed within the plenum section 8 in order to assist the reverse gas flow required as the hot gases leave sections 13 and enter the upstream end of sections 14.

In FIG. 2 of the drawing, there is shown an embodiment with an outer housing 20 having end sections 21 and 22, as well as internal partitions 23 so as to define an inner catalyst section 24 and spaced apart outer catalyst sections 25. An exhaust gas inlet to the unit is provided through the inlet port means 26 which in turn connects with or communicates with the interior catalyst retaining section 24. Longitudinally, the catalyst is retained by an upstream perforate plate means 27 and by a downstream perforate plate means 28. The latter is spaced from the end section 22 so as to provide a distribution zone 29 whereby there is a reverse flow of the exhaust gas stream through perforate partitioning 28 into the two spaced apart catalyst sections 25. Provision is also made for the introduction of air by way of port means 30 into a redistribution section 29, whereby air will be uniformly mixed with the partially contacted gas stream entering sections 25. The fully treated exhaust gas stream will leave at the downstream end of these second stage catalyst zones 25 through perforate plate means 31 to enter into an outlet plenum 32 and then be discharged by way of outlet port 33.

In a manner similar to the arrangement of FIG. 1, it will be seen that the embodiment of FIG. 2 will permit a reducing catalyst contact within an interiorly maintained zone so as to minimize heat loss from the unit in that there is a partial encompassing of such section by the oxidizing catalyst zones 25 whereby heat from the latter will, in turn, carry by heat exchange relationship to the inner zone 24. It will be further noted that there is no air introduction into the first stage catalyst section in order to enhance the $NO_x$ reduction step at the high temperature conditions and to preclude the production of nitrogen oxides. The air that is added at the downstream end of this first stage zone 24 insures that there is adequate oxygen available for completion of the oxidation of CO and unburned hydrocarbons to harmless products that can be discharged by way of collection section 32 and outlet port 33.

The housing and contact zones are preferably elongated, as shown; however, as indicated in FIGS. 3 and 3a the cross-section may be of an oval configuration, or of a rectangular shape. Still further, although not shown in the drawing, there may be the addition of suitable insulating materials around the converter-muffler housings in order to retain heat in the catalyst contact sections as well as to preclude high temperature radiation to any sensitive or dangerous areas of the particular vehicle.

With reference to FIG. 4 of the drawing, there is shown a simplified embodiment where a housing 34 holds two side-by-side catalyst sections 35 and 36 that are in heat exchange relationship with one another, being separated only by a longitudinal partition 37 extending between the end plate 38 and the transverse perforated partition plate 39. In the operation of this embodiment, the exhaust gas stream enters inlet port 40 to pass through the catalytic reducing zone 35 and then reverses its flow direction at the redistribution zone 41, between spaced plates 39 and 42, to then pass through catalytic oxidation zone 36 and be discharged by way of outlet port 43. Communicating with the redistribution zone 41 is an air inlet port 44 which provides oxygen for the catalytic oxidation reactions to take place within the second stage zone 36. As to cross-section, the housing 34 may be oval as in FIG. 3 or may be rectangular such as shown in FIG. 3a. Also, although not shown, there may be a suitable heat retaining insulation provided around the periphery of the housing 34.

Still further, at least a portion of inlet conduit conduit connective with port 40 may be positioned to be along side of, or through, the second stage zone 36 so as to obtain preheating therefrom.

I claim:

1. In the catalytic conversion of an internal combustion engine exhaust gas stream, the improved method of treatment to reduce emission of nitrogen oxides which comprises, passing the exhaust gas stream without cooling and without admission of air into contact with a first stage of reduction catalyst to effect catalytic reducion of nitrogen oxides, subsequently mixing air with the resulting product stream and passing the mixture into contact with a second stage catalyst bed maintained in a heat exchange relationship with said first catalyst stage to transfer heat thereto and to effect oxidation and elimination of carbon monoxide and unburned hydrocarbons from the exhaust gas stream.

2. The method of claim 1 further characterized in that the exhaust gas stream carries to an initial distribution zone and then passes through an internal first stage reduction catalyst and then subsequent to the mixing of the resulting stream with air there is a reverse direction of flow and passage through a second stage of catalyst maintained to at least partially encompass said first stage catalyst zone, whereby there is a heat exchange relationship between the two adjacent catalyst contact zones.

3. The method of claim 1 further characterized in that there is a passage of said exhaust gas stream in heat exchange relationship with at least a portion of said second stage, catalyst bed to enhance the heating of such stream.

4. The method of claim 1 further characterized in that the first stage catalyst reduction step is effected in an inner zone maintained as at least one layer between spaced apart catalyst layers providing a second stage of catalyst contact and the resulting contacted stream from the first stage of catalyst contact is mixed with air at the downstream end of the latter stage to then reverse direction of flow and pass through the second stage oxidizing zone for heat exchange with said inner zone.

5. A two-stage catalytic converter-muffler for treating an engine exhaust gas stream, which comprises in combination, an elongated outer housing having longitudinal, non-perforate partitioning means spaced from the housing and forming an elongated first stage catalyst retaining section and a separate adjacent second stage catalyst retaining section, additional partitioning in said housing at the downstream end of said first catalyst section forming a air inlet plenum section between said catalyst retaining sections, a gas stream inlet to said first stage section, an air inlet to said plenum section, and a treated gas outlet means from said housing and from the downstream end of said second stage catalyst retaining section.

6. The two-stage catalytic converter-muffler of claim 5 further characterized in that said gas inlet to said first stage catalyst section carries axially through the central portion of the housing and through the interior of said first catalyst retaining section, said non-perforate partitioning being positioned to maintain the latter in spaced apart catalyst layers in turn positioned between spaced apart layers providing said second stage catalyst section whereby gas flow has a reverse direction of flow through said first stage catalyst retaining section as compared with the flow into said housing and through the adjacent second stage catalyst retaining section.

7. The two-stage catalytic converter-muffler of claim 5 further characterized in that said first stage catalyst containing section is of elongated form positioned axially within said housing and said second stage catalyst retaining section is split into two spaced layers at least partially encompassing said first stage catalyst section to be in heat exchange relationship therewith, and said plenum section and said air inlet thereto are positioned at the downstream end of said first stage catalyst section whereby there is a reversal in flow direction for said gas stream flow along with the added air, through the encasing second stage catalyst section.

8. The two-stage catalytic converter-muffler of claim 5 further characterized in that said second stage catalyst retaining section is of a non-circular layer-like configuration and in a side-by-side adjacent relationship with said first stage catalyst retaining section, whereby there is but one heat exchange surface existant between the two sections.

References Cited
UNITED STATES PATENTS

| | | | |
|---|---|---|---|
| 3,544,264 | 12/1970 | Hardison | 23—2 E |
| 1,402,814 | 1/1922 | Wachtel | 23—2 E |
| 3,067,002 | 12/1962 | Reid | 23—2 E |
| 3,224,842 | 12/1965 | Manske | 23—2 E |
| 3,295,919 | 1/1967 | Henderson et al. | 23—2 E |

EARL C. THOMAS, Primary Examiner

U.S. Cl. X.R.

23—288 F; 60—301; 423—214